(12) United States Patent
Serrao et al.

(10) Patent No.: US 11,945,293 B2
(45) Date of Patent: Apr. 2, 2024

(54) DUAL MOTOR ELECTRIC DRIVELINE

(71) Applicant: DANA ITALIA S.R.L., Trentino (IT)

(72) Inventors: Lorenzo Serrao, Torbole sul Garda (IT); Filip Van Raepenbusch, Bruges (BE)

(73) Assignee: DANA ITALIA S.R.L., Arco (IT)

( * ) Notice: Subject to any disclaimer, the term of this patent is extended or adjusted under 35 U.S.C. 154(b) by 42 days.

(21) Appl. No.: 17/654,219

(22) Filed: Mar. 9, 2022

(65) Prior Publication Data

US 2022/0194195 A1  Jun. 23, 2022

Related U.S. Application Data

(63) Continuation of application No. 16/899,284, filed on Jun. 11, 2020, now Pat. No. 11,312,218.

(30) Foreign Application Priority Data

Jun. 13, 2019 (EP) .................................. 19179890

(51) Int. Cl.
| | |
|---|---|
| *F16H 63/46* | (2006.01) |
| *B60K 1/02* | (2006.01) |
| *B60K 17/02* | (2006.01) |
| *B60K 17/06* | (2006.01) |
| *B60K 23/02* | (2006.01) |

(Continued)

(52) U.S. Cl.
CPC .............. *B60K 1/02* (2013.01); *B60K 17/02* (2013.01); *B60K 17/06* (2013.01); *B60K 23/02* (2013.01); *B60K 25/06* (2013.01); *B60W 10/02* (2013.01); *B60W 10/08* (2013.01); *B60W 10/30* (2013.01); *F16D 48/06* (2013.01); *F16H 63/46* (2013.01); *B60K 2025/005* (2013.01); *B60W 2510/02* (2013.01); *B60W 2510/1015* (2013.01); *B60W 2510/1025* (2013.01); *B60W 2710/021* (2013.01); *B60W 2710/081* (2013.01); *B60W 2710/083* (2013.01); *F16D 2500/10412* (2013.01); *F16D 2500/10437* (2013.01); *F16D 2500/30814* (2013.01); *F16D 2500/30816* (2013.01); *F16D 2500/316* (2013.01)

(58) Field of Classification Search
CPC .......... B60K 1/02; B60K 17/02; B60K 25/06; B60K 17/28
See application file for complete search history.

(56) References Cited

U.S. PATENT DOCUMENTS 9,657,460 B2 * 5/2017 Naito ..................... B60K 6/387
9,981,650 B2 * 5/2018 Lindström ............... B60K 1/02
(Continued)

*Primary Examiner* — Derek D Knight
(74) *Attorney, Agent, or Firm* — McCoy Russell LLP

(57) ABSTRACT

Methods and sysemteds for a driveline, comprising: a transmission having an input and an output, a power take-off (PTO), a first electric motor drivingly engaged or selectively drivingly engaged with the input of the transmission, a second electric motor, a first clutching device, and a second clutching device, wherein the second electric motor is selectively drivingly engaged with the input of the transmission through the first clutching device, and wherein the second electric motor is selectively drivingly engaged with the PTO through the second clutching device. The present document further relates to a vehicle including said dual motor electric driveline, and to a method of controlling said dual motor electric driveline.

18 Claims, 5 Drawing Sheets

(51) Int. Cl.
  *B60K 25/06* (2006.01)
  *B60W 10/02* (2006.01)
  *B60W 10/08* (2006.01)
  *B60W 10/30* (2006.01)
  *F16D 48/06* (2006.01)
  *B60K 25/00* (2006.01)

(56) References Cited

U.S. PATENT DOCUMENTS

| | | | |
|---|---|---|---|
| 11,312,218 B2* | 4/2022 | Serrao | B60K 17/02 |
| 2011/0042155 A1 | 2/2011 | Tarasinski et al. | |
| 2012/0149520 A1* | 6/2012 | Schneidewind | B60L 15/20 |
| | | | 475/296 |
| 2012/0221197 A1* | 8/2012 | Hisada | B60L 1/003 |
| | | | 74/665 F |

* cited by examiner

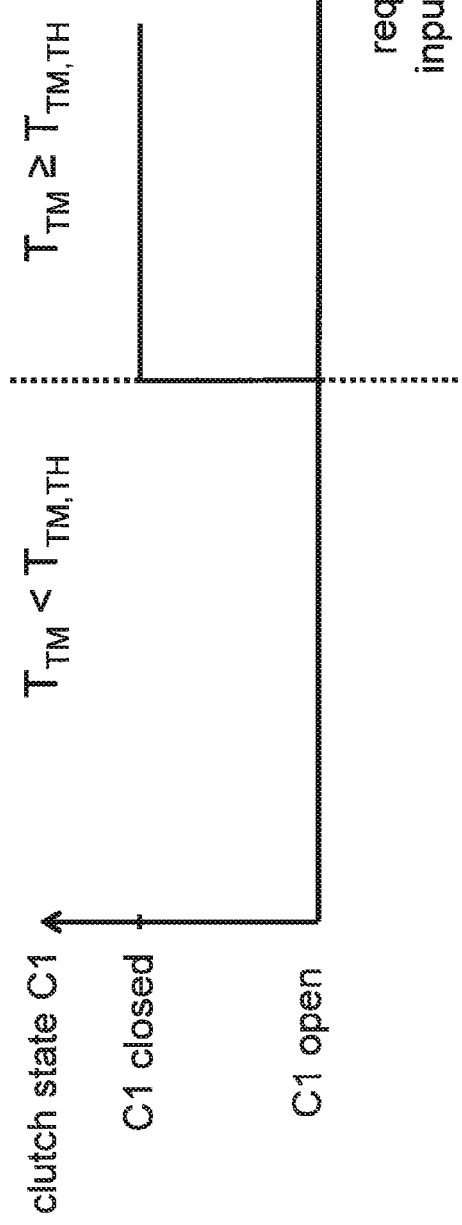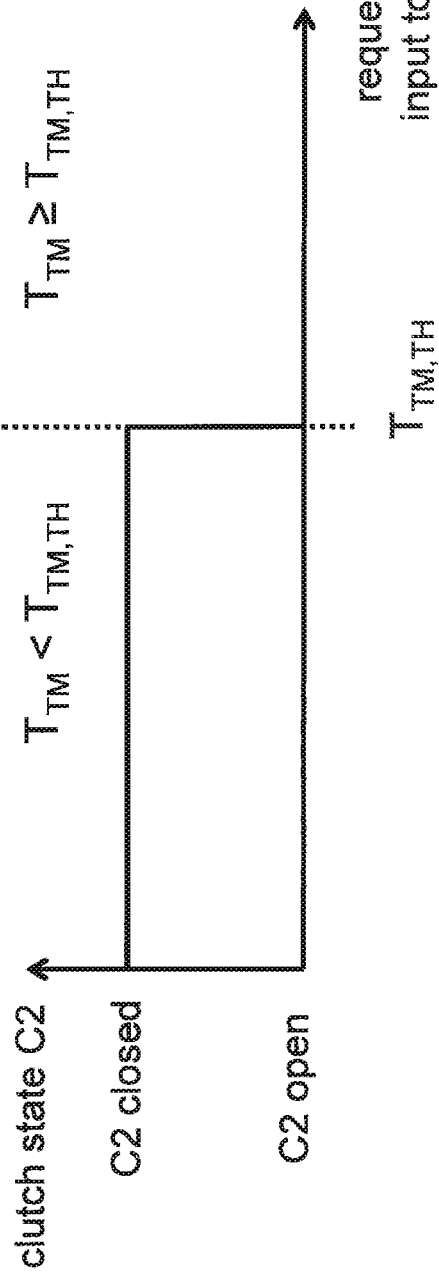

DUAL MOTOR ELECTRIC DRIVELINE

CROSS-REFERENCE TO RELATED APPLICATION

The present application is a continuation of U.S. Non-Provisional patent application Ser. No. 16/899,284, entitled "DUAL MOTOR ELECTRIC DRIVELINE", and filed on Jun. 11, 2020. U.S. Non-Provisional patent application Ser. No. 16/899,284 claims priority to European Patent Application No. 19179890.9, entitled "DUAL MOTOR ELECTRIC DRIVELINE", and filed on Jun. 13, 2019. The entire contents of the above-listed application is hereby incorporated by reference for all purposes.

BACKGROUND AND SUMMARY

The present document relates to a dual or multi-motor electric driveline, to an electric vehicle comprising said electric driveline, and to a method of operating said electric driveline. For example, dual motor electric drivelines of the presently proposed type may find application in working machines, for example in off-highway vehicles such as teleboom handlers, forklift trucks, tractors, excavators, dumpers, mining vehicles, or the like.

In an electric driveline such as an electric driveline used in an off-highway vehicle, different strategies may be used to provide power to the wheels and to the work functions, which may include, for instance, at least one of a telescopic boom, a bucket, a winch, a lifting mechanism or a tilting mechanism. For example, one option is to couple an electric motor to a traditional torque-converter (TC) transmission which may be connected to both traction and auxiliary devices such as hydraulic pumps. However, in this case the TC usually needs to be used as speed-decoupler, which typically results in low energy efficiency. E. g., when the vehicle moves slowly and the TC drives the working pumps at high flow, the vehicle brakes have to dissipate the excessive power provided by the TC. Another option is to provide separate electric motors for driving the wheels and the work functions, respectively. In this case, the wheels and the work functions may be powered each at a different speed, which typically increases energy efficiency. However, installing an additional electric motor increases material costs.

Thus, there is demand for an electric driveline which may be manufactured at preferably low costs, which may be operated at a preferably high degree of efficiency, and which may be used to power both traction and work functions.

This object is solved by a dual motor electric driveline, such as by a vehicle including said dual motor electric driveline, and/or by a method of operating said dual motor electric driveline.

In an embodiment, a dual or multi-motor electric driveline comprises:
- a transmission (TM) having an input and an ouput,
- a power take-off (PTO),
- a first electric motor drivingly engaged or selectively drivingly engaged with the input of the TM,
- a second electric motor,
- a first clutching device, and
- a second clutching device,
- wherein the second electric motor is selectively drivingly engaged with the input of the TM through the first clutching device, and
- wherein the second electric motor is selectively drivingly engaged with the PTO through the second clutching device.

Embodiments of the presently proposed dual motor electric driveline, vehicle and method of operation are described in the following detailed description and are depicted in the Figures.

BRIEF DESCRIPTION OF THE FIGURES

FIG. 4A schematically shows an embodiment of a method of controlling a first clutching device of the dual motor electric driveline of FIGS. 1 and 2.

FIG. 4B schematically shows an embodiment of a method of controlling a second clutching device of the dual motor electric driveline of FIGS. 1 and 2.

DETAILED DESCRIPTION

Figure 1:
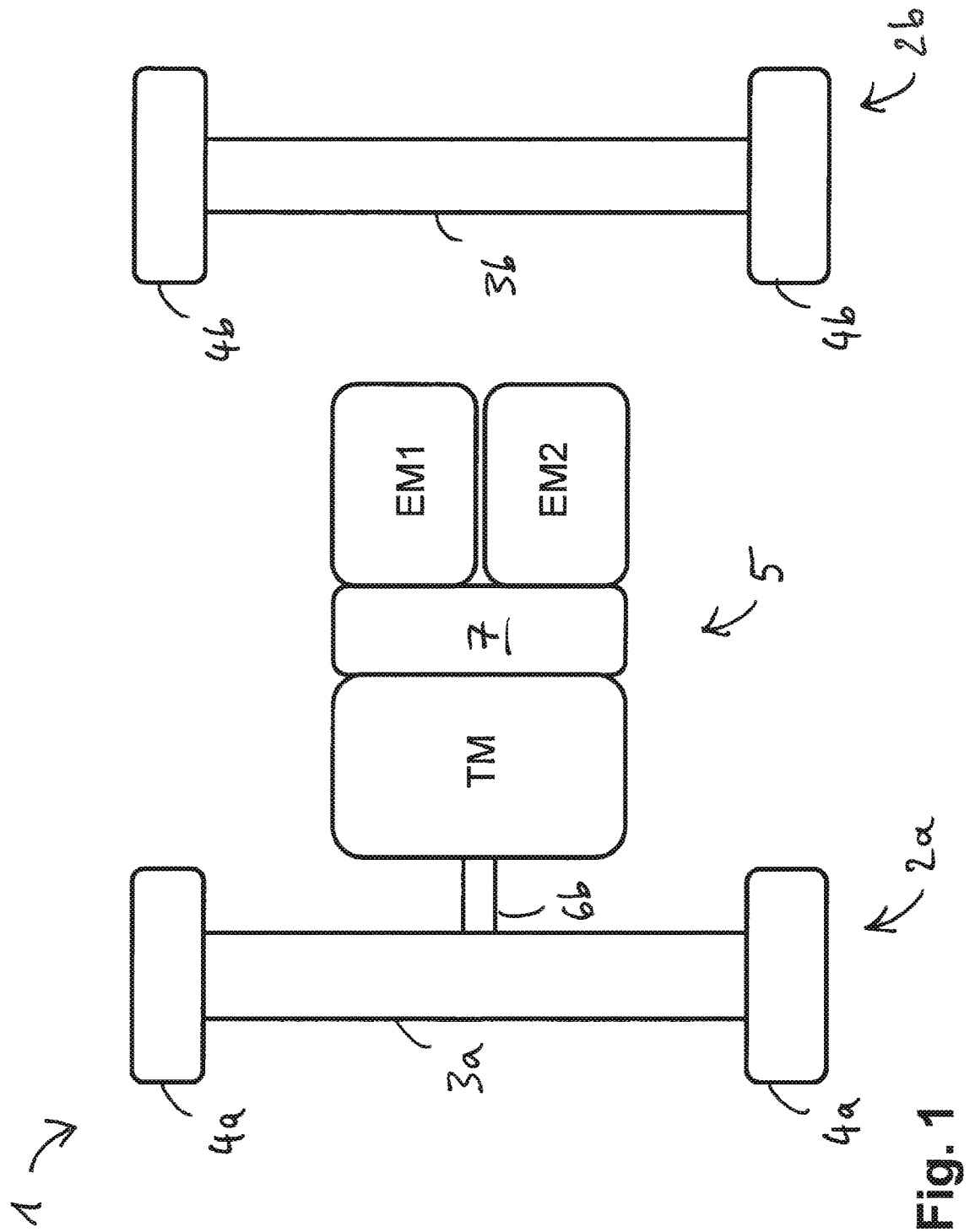
FIG. 1 schematically shows an embodiment of a vehicle including a dual motor electric driveline.

As noted herein, in an embodiment, a dual or multi-motor electric driveline comprises a transmission (TM) having an input and an output, a power take-off (PTO), a first electric motor drivingly engaged or selectively drivingly engaged with the input of the TM, a second electric motor, a first clutching device, and a second clutching device, wherein the second electric motor is selectively drivingly engaged with the input of the TM through the first clutching device, and wherein the second electric motor is selectively drivingly engaged with the PTO through the second clutching device.

The second electric motor may be selectively drivingly engaged with either one of the PTO and the input of the TM, the presently proposed dual motor electric driveline may be operated with a high degree of efficiency and may be manufactured at low cost. For example, the flexible coupling between the second electric motor and the TM and the PTO provided by the first clutching device and the second clutching device allows the first electric motor and the second electric motor to be smaller than the electric motors used in conventional single motor electric drivelines. For example, the first electric motor and the second electric motor may be dimensioned such that when both the first electric motor and the second electric motor are drivingly engaged with the TM they may provide a traction power equal to or higher than a TM input power threshold or a traction torque equal to or higher than a TM input torque threshold. For example, the electric motors may be dimensioned such that together they may provide at least the same power or the same torque as a conventional diesel engine or as a single electric motor in a conventional driveline.

However, when the power and/or torque requested at the TM input is below a TM input power threshold or below a TM input torque threshold, the first clutching device may be opened and the second clutching device may be closed to drivingly disengage the second electric motor from the TM and to drivingly engage the second electric motor with the PTO, for example to power one or more auxiliary devices connected to the PTO. In this situation, the TM and the PTO are powered by separate motors, thereby providing a high degree of efficiency. Use of the presently proposed driveline may be particularly advantageous in vehicles or machines such as material handling vehicles in which work functions connected to the PTO are mostly used when the traction power or the traction torque requested at the input of the TM is below a TM input power threshold or below a TM input torque threshold, for example when the vehicle drives at a low speed or when the vehicle is at a standstill.

The first electric motor and/or the second electric motor may be or may comprise any kind of electric motor known in the art of drivelines or powertrains, in particular in the art of automotive drivelines or powertrains. For example, the first electric motor and the second electric motor may be of the same type or may be of different types. For instance, the first electric motor and the second electric motor may be configured to provide the same maximum output power, or the first electric motor may be configured to provide a higher or a lower maximum output power than the second electric motor. At least one of or both of the first electric motor and the second electric motor may be drivingly engaged or configured to be drivingly engaged with the input of the transmission via a reduction drive ratio different from 1. Also, depending on the layout of the first electric motor and the second electric motor it is conceivable that a first reduction drive ratio between the first electric motor and the input of the transmission is different from a second reduction drive ratio between the second electric drive motor and the input of the transmission.

The transmission may be any kind of transmission known in the art of drivelines or powertrains, in particular in the art of automotive drivelines or powertrains. For example, the transmission may be configured as a stepped ratio transmission or as a continuously variable transmission such as a hydrostatic transmission. Usually, the transmission is configured to selectively provide at least a first gear ratio and a second gear ratio between the input and to output of the transmission.

The first clutching device and/or the second clutching may comprise any kind of clutching device known in the art of drivelines or transmissions, in particular in the art of automotive drivelines or transmissions. For example, the first clutching device and/or the second clutching device may comprise a wet clutch, a dry clutch, an electromagnetically driven clutch, a dog clutch or a synchronizer. However, it is understood that the first clutching device and/or the second clutching device may comprise other types of clutches known in the art.

The dual motor electric driveline may further comprise an auxiliary device drivingly engaged or selectively drivingly engaged with the PTO. For example, the auxiliary device may include one or more hydraulic pumps drivingly engaged or selectively drivingly engaged with the PTO for driving one or more hydraulic implements such as one or more hydraulic motors and/or one or more hydraulic cylinders through the PTO. Additionally or alternatively, the auxiliary device may include a mechanical joint and/or a shaft drivingly engaged or selectively drivingly engaged with the PTO. The auxiliary device may be configured to drive a work function such as a boom, a winch, a bucket, a lifting mechanism, a tilting mechanism, or the like.

The dual motor electric driveline may further comprise at least one input device, such as a pedal, a knob, a switch, a joystick or a lever, or the like, for opening and closing the first clutching device and/or for opening and closing the second clutching device. The at least one input device is typically configured to be controlled by an operator or driver. In other words, the operator or driver may selectively open and close the first clutching device and/or the second clutching device using the at least one input device.

The dual motor electric driveline may further comprise an electronic control unit (ECU) with instructions stored in memory to carry out the various actions described herein in cooperation with a processor and one or more sensors and/or actuators. For example, the ECU typically includes electric circuitry such as one or more programmable processors, for example one or more programmable microprocessors and/or one or more FPGAs, or the like. The ECU may be configured to control the first clutching device and/or the second clutching device based on at least one of or all of:

a current transmission input speed and/or a requested transmission input speed,
a current transmission input torque and/or a requested transmission input torque,
a current transmission input power and/or a requested transmission input power,
a current PTO speed and/or a requested PTO speed,
a current PTO torque and/or a requested PTO torque, and
a current PTO power and/or a requested PTO power.

For example, the dual motor electric driveline may include one or more speed sensors for determining at least one of or all of the current transmission input speed, a current transmission output speed, or the PTO speed. Additionally or alternatively, the dual motor electric driveline may include one or more input devices such as a pedal, a knob, a switch, a joystick, a lever, or the like. At least one of or all of the requested transmission input speed, the requested transmission input torque, the requested transmission input power, the requested PTO speed the requested PTO torque, and the requested PTO power may then be determined based on a control position of the one or more input devices.

The ECU may be configured or programmed to close the first clutching device or to keep the first clutching device closed to drivingly engage or to additionally drivingly engage the second electric motor with the input of the transmission if or when the current transmission input speed or the requested transmission input speed exceeds an upper transmission input speed threshold, and/or if or when the current transmission input torque or the requested transmission input torque exceeds an upper transmission input torque threshold, and/or if or when the current transmission input power or the requested transmission input power exceeds an upper transmission input power threshold.

The ECU may be configured or programmed to open the second clutching device or to keep the second clutching device open to drivingly disengage the second electric motor from the PTO if or when the current transmission input speed or the requested transmission input speed exceeds the upper transmission input speed threshold, and/or if or when the current transmission input torque or the requested transmission input torque exceeds the upper transmission input torque threshold, and/or if or when the current transmission input power or the requested transmission input power exceeds the upper transmission input power threshold.

The ECU may be configured or programmed to open the second clutching device or to keep the second clutching device open to drivingly disengage the second electric motor from the PTO or to keep the second electric motor disengaged from the PTO if or when the current PTO speed or the requested PTO speed is or falls below a lower PTO speed threshold, and if or when the current PTO torque or the requested PTO torque is or falls below a lower PTO torque threshold, and if or when the current PTO power or the requested PTO power is or falls below a lower PTO power threshold.

In this way, the second electric motor may be disconnected or drivingly disengaged from the PTO and/or may be connected with or drivingly engaged with the input of the transmission through the first clutching device, so that both the first electric motor and the second electric motor may drive the input of the transmission to provide a sufficiently high speed and/or torque and/or power at the input of the transmission.

The ECU may be configured or programmed to control the second electric motor and to synchronize a speed of the second electric motor with a current transmission input speed before or right before closing the first clutching device to drivingly engage the second electric motor with the input of the transmission through the first clutching device. Typically, the ECU opens the second clutching device when or before synchronizing the speed of the second electric motor with the current transmission input speed before closing the first clutching device. Synchronizing the speed of the second electric motor with the current transmission input speed may include tuning the speed of the second electric motor to the current transmission input speed so that the speed of the second electric motor falls within a speed interval including the current transmission input speed. For example, the speed interval may include all speed values that differ from the current transmission input by less than 10 percent or by less than 5 percent of the current transmission input speed.

The ECU may be configured or programmed to open the first clutching device or to keep the first clutching device open to drivingly disengage the second electric motor from the input of the transmission if or when the current transmission input speed or the requested transmission input speed is or falls below a lower transmission input speed threshold, and/or if or when the current transmission input torque or the requested transmission input torque is or falls below a lower transmission input torque threshold, and/or if or when the current transmission input power or the requested transmission input power is or falls below a lower transmission input power threshold.

The ECU may be configured or programmed to close the second clutching device or to keep the second clutching device closed to drivingly engage the second electric motor with the PTO if or when the current transmission input speed or the requested transmission input speed is or falls below the lower transmission input speed threshold, and/or if or when the current transmission input torque or the requested transmission input torque is or falls below the lower transmission input torque threshold, and/or if or when the current transmission input power or the requested transmission input power is or falls below the lower transmission input power threshold.

The ECU may be configured or programmed to close the second clutching device or to keep the second clutching device closed to drivingly engage the second electric motor with the PTO if or when the current PTO speed or the requested PTO speed exceeds an upper PTO speed threshold, and/or if or when the current PTO torque or the requested PTO torque exceeds an upper PTO torque threshold, and/or if or when the current PTO power or the requested PTO power exceeds an upper PTO power threshold.

In this way, the second electric motor may be disconnected or drivingly disengaged from the transmission and may be connected with or drivingly engaged with the PTO through the second clutching device if or when the speed and/or torque and/or power requested at the input of the transmission is below a given threshold, thereby allowing the PTO and the transmission to be driven through separate motors and at a high degree of efficiency.

The lower transmission input speed threshold may be equal to or smaller than the upper transmission input speed threshold. The lower transmission input torque threshold may be equal to or smaller than the upper transmission input torque threshold. And the lower transmission input power threshold may be equal to or smaller than the upper transmission input power threshold. The lower PTO speed threshold may be equal to or smaller than the upper PTO speed threshold. The lower PTO torque threshold may be equal to or smaller than the upper PTO torque threshold. And the lower PTO power threshold may be equal to or smaller than the upper PTO power threshold.

The ECU may be configured or programmed to control the second electric motor and to synchronize a speed of the second electric motor with a current PTO speed before or right before closing the second clutching device to drivingly engage the second electric motor with the PTO through the second clutching device. Typically, the ECU opens the first clutching device when or before synchronizing the speed of the second motor with the current PTO speed. Synchronizing the speed of the second electric motor with the current PTO speed may include tuning the speed of the second electric motor to the current PTO speed so that the speed of the second electric motor falls within a speed interval including the current PTO speed. For example, the speed inverval may include all speed values that differ from the current PTO by less than 10 percent or by less than 5 percent of the current PTO speed.

When the transmission is shifted from the first gear ratio to the second gear ratio of the transmission and both the first electric motor and the second electric motor are drivingly engaged with the input of the transmission, the ECU may be configured to simultaneously synchronize a speed of the first electric motor and a speed of the second electric motor with a target speed. Typically, the target speed is based at least on a current transmission output speed and based on the second gear ratio between the input and the output of the transmission. Usually, the target speed is or is based on the current transmission output speed mutiplied with the second gear ratio between the input and the output of the trasmission. In case the first electric motor is drivingly engaged with the input of the transmission via a first reduction drive ratio different from 1, the target speed of the first electric motor may further be based on the first reduction drive ratio. And in case the second electric motor is drivingly engaged with the input of the transmission via a second reduction drive ratio different from 1, the target speed of the second electric motor may further be based on the second reduction drive ratio. In particular, if the first reduction drive ratio is different from the second reduction drive ratio, the target speed of the first motor may be different from the target speed of the second drive motor.

By synchronizing the speed of the first electric motor and the speed of the second electric motor with the target speed in this way, the shift may be carried out in a particularly smooth manner. Synchronizing the speed of the first electric motor and the speed of the second electric motor with the target speed may include tuning the speed of the first electric motor and the speed of the second electric motor to the target speed so that the speed of the first electric motor and the speed of the second electric motor each fall within a speed interval including the target speed. For example, the speed interval may include all speed values that differ from the target speed by less than 10 percent or by less than 5 percent of the target speed.

When each of the following conditions (1.1)-(1.3) is met:
(1.1) the transmission is shifted from the first gear ratio to the second gear ratio,
(1.2) both the first electric motor and the second electric motor are drivingly engaged with the input of the transmission, and
(1.3) the requested transmission input speed is below the transmission input speed threshold or the requested transmission input torque is below the transmission input torque threshold or the requested transmission input power is below the transmission input power threshold, the ECU may be configured to carry out at least one, a plurality or all of the following steps (2.1)-(2.5):
(2.1) open the first clutching device to drivingly disengage the second electric motor from the input of the transmission,
(2.2) synchronize a speed of the first electric motor with a current transmission output speed corresponding to the second gear ratio between the input and the output of the transmission,
(2.3) when the speed of the first electric motor has been synchronized with the current transmission output speed corresponding to the second gear ratio between the input and the output of the transmission, complete the shift from the first gear ratio to the second gear ratio,
(2.4) synchronize a speed of the second electric motor with the current transmission output speed corresponding to the second gear ratio between the input and the output of the transmission, and
(2.5) when the speed of the second electric motor has been synchronized with the current transmission output speed corresponding to the second gear ratio between the input and the output of the transmission, close the first clutching device to drivingly engage the second electric motor with the input of the transmission.

The ECU may be configured to simultaneously close the first clutching device and the second clutching device to drivingly engage the PTO with the input of the transmission to allow energy to be transferred between the PTO and the input of the transmission. In this way, energy absorbed via the transmission such as during braking of one or more wheels drivingly engaged with the output of the transmission may be transmitted to the PTO, for example to drive an auxiliary device drivingly connected with the PTO. Or energy absorbed via the PTO such as during lowering of a lifting mechanism drivingly engaged with the PTO may be transmitted to the output of the transmission, for example to drive one or more vehicle wheels drivingly engaged with the output of the transmission.

Simultaneously closing both the first clutching device and the second clutching device may be advantageous also when the transmission has a neutral gear in which the input and the output of the transmission are drivingly disengaged from one another. For example, the ECU may be configured to simultaneously close the first clutching device and the second clutching device and to shift the transmission to the neutral gear in order to drivingly engage both electric motors with the PTO, for example in order to provide a particularly high torque or a particularly high power at the PTO for driving the auxiliary device.

Furthermore, an electric vehicle comprising the above-described dual motor electric driveline is presently proposed. Typically, the vehicle further includes a ground engaging structure, such as one or more wheels or a crawler chain, drivingly engaged or selectively drivingly engaged with the output of the transmission. The vehicle may be an off-highway vehicles such as a teleboom handler, a forklift truck, a tractor, an excavator, a dumper, a mining vehicle, or the like. Further, a method of operating the above-described dual motor electric driveline is presently proposed. The method comprises controlling the first clutching device and the second clutching device based on at least one of or all of:
a current transmission input speed and/or a requested transmission input speed,
a current transmission input torque and/or a requested transmission input torque,
a current transmission input power and/or a requested transmission input power
a current PTO speed and/or a requested PTO speed,
a current PTO torque and/or a requested PTO torque, and
a current PTO power and/or a requested PTO power.

The method may further include one or more of the above-described steps which may be performed or carried out by the ECU.

FIG. 1 is a schematic view of an electric vehicle 1. The electric vehicle 1 may be an off-highway vehicle such as a boom handler, a forklift truck, a tractor, an excavator, a dumper, a mining vehicle, a forestry machine, or the like. The electric vehicle 1 comprises a front axle assembly 2a, a rear axle assembly 2b and a dual motor electric driveline 5. The front axle assembly 2a includes a front axle 3a and a set of front wheels 4a in driving engagement with the front axle 3a, and the rear axle assembly 2b includes a rear axle 3b and a set of rear wheels 4b. In the embodiment of the electric vehicle 1 depicted in FIG. 1 the dual motor electric driveline 5 is in driving engagement with the front axle assembly 2a. However, it is understood that in alternative embodiments not explicitly depicted here the dual motor electric driveline 5 may be in driving engagement with the rear axle assembly 2b or with both the front axle assembly 2a and the rear axle assembly 2b.

Figure 2:
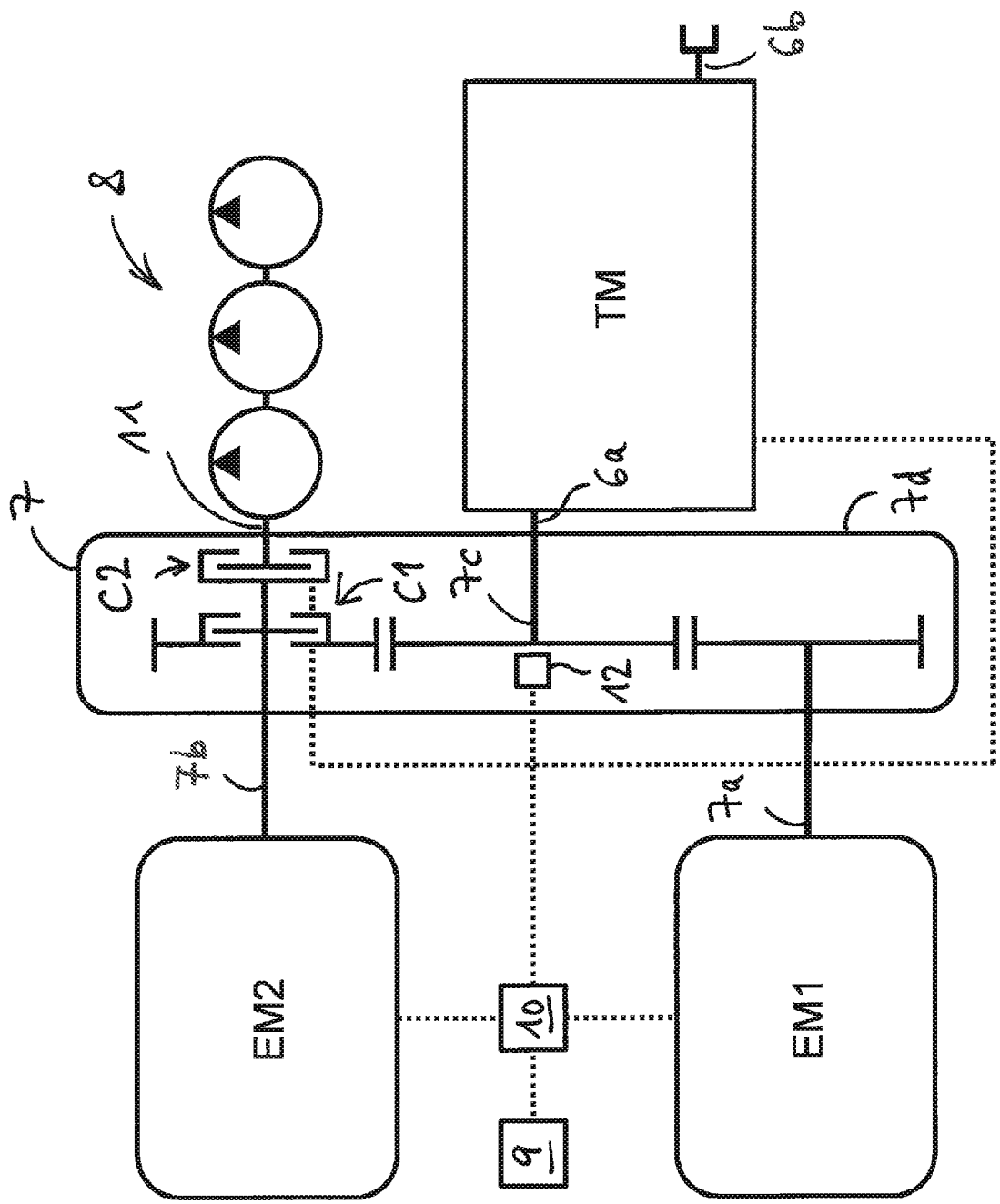
FIG. 2 schematically shows a detailed view of the dual motor electric driveline of FIG. 1.

FIG. 2 illustrates a more detailed schematic of the embodiment of the dual motor electric driveline 5 of FIG. 1, wherein here and in all of the following recurring features are designated with the same reference signs. The dual motor electric driveline 5 comprises a first electric motor EM1, a second electric motor EM2, a transmission TM having an input 6a and an output 6b, a coupling device 7 for coupling or for selectively coupling the electric motors EM1, EM2 with the transmission TM, at least one auxiliary device 8, at least one input device 9 configured to be controlled by an operator, and an electronic control unit (ECU) 10. The ECU 10 is in communication with the input device 9 and is configured to control the electric motors EM1 EM2, the transmission TM, and the coupling device 7. The at least one input device 9 may include at least one of a pedal, a lever, a knob, a switch, a joystick, a wheel, a microphone, or a camera, for example. The output 6b of the transmission TM is in driving engagement or in selective driving engagement with the front axle assembly 2a of the electric vehicle 1, see FIG. 1. In the present example, each of the electric motors EM1, EM2 may include a DANA TM4 SUMO having a maximum speed of about 4700 rpm, a maximum torque of 1000 Nm each, and an operating voltage between 350 Volts and 750 Volts. However, it is understood that in alternative embodiments the electric motors EM1, EM2 may include any other kind of electric motor known in the art. In particular, the electric motors EM1, EM2 may be of the same type or of different types, depending on the application.

The coupling device 7 comprises a first input 7a in driving engagement with the first electric motor EM1, a second input 7b in driving engagement with the second electric motor EM2, and output 7c in driving engagement with the input 6a of the transmission TM. The coupling device further comprises a power take-off (PTO) 11 in driving engagement with the at least one auxiliary device 8. In the embodiment of the driveline 5 depicted in FIG. 2 the at least one auxiliary device 8 includes a set of hydraulic pumps. The hydraulic pumps of the auxiliary device 8 may be in fluid communication with one or more hydraulic implements such as with one or more hydraulic motors and/or with one or more hydraulic cylinders for driving these hydraulic implements (not shown). Additionally or alternatively, the at least one auxiliary device 8 may include one or more mechanical joints or one or more shafts, for example. Generally, the PTO 11 of the coupling device 7 may be used to drive work functions of the electric vehicle 1 which may include a boom, a winch, a bucket, a drill, a lifting mechanism, a tilting mechanism, or the like.

The coupling device 7 further includes a first clutching device C1, a second clutching device C2 and a transmission input speed sensor 12 in communication with the ECU 10 for determining a speed of the input 6a of the transmission TM. Additionally or alternatively, the driveline 5 may include another speed sensor in communication with the ECU 10 for determining a speed of the output 6b of the transmission TM. Further, the first electric motor EM1 typically comprises a speed sensor in communication with the ECU 10 for determining a speed of the first electric motor EM1, and the second electric motor EM2 typically comprises a speed sensor in communication with the ECU 10 for determining a speed of the second electric motor EM2 (not shown). The coupling device 7 further provides a first reduction drive ratio between the first input 7a of the coupling device 7 and the input 6a of the transmission TM, and a second reduction drive ratio between the second input 7b of the coupling device 7 and the input 6a of the transmission TM. The first reduction drive ratio and the second reduction drive ratio may be between 1.2:1 and 4:1, for example. However, it is understood that in alternative embodiments the drive ratios between the inputs 7a, 7b of the coupling device 7 and the input 6a of the transmission may take on other ratio values, including a ratio of 1:1, for example. Depending on the application and the layout of the electric motors Em1, EM2 the first reduction drive ratio and the second reduction drive ratio may be the same or may be different from one another.

In the embodiment of the driveline 5 depicted in FIG. 2, the coupling device 7 further includes a housing 7d which is separate from a housing of the transmission TM. At least the clutching devices C1, C2 and the PTO 11 are disposed inside the housing 7d of the coupling device 7. The fact the coupling device 7 and the transmission TM have separate housings may allow a particularly flexible layout of the driveline 5. For example, it may allow providing the coupling device 7 as an add-on upon request. However, it is understood that in alternative embodiments of the driveline 5 not explicitly depicted here the coupling device 7 and the transmission TM may be disposed in a single housing.

C1 may include a wet clutch, a dry clutch, a hydraulically actuated clutch, an electromagnetically actuated clutch, a dog clutch, a synchronizer, or any other type of clutching device known in the art of mechanical transmissions. Similarly, C2 may include a wet clutch, a dry clutch, a hydraulically actuated clutch, an electromagnetically actuated clutch, a dog clutch, a synchronizer, or any other type of clutching device known in the art of mechanical transmissions.

C1 is configured to selectively drivingly engage the second electric motor EM2 with the input 6a of the transmission TM, and C2 is configured to selectively drivingly engage the second electric motor EM2 with the PTO 11. In other words, each of C1 and C2 may be selectively switched between a closed state and an open state. When C1 is in the closed state, C1 drivingly engages the second electric motor EM2 with the transmission TM so that EM2 may drive or may additionally drive the transmission TM. And when C1 is in the open state, C1 disengages the second electric motor EM2 from the transmission TM. Similarly, when C2 is in the closed state, C2 drivingly engages the second electric motor EM2 with the PTO 11 so that EM2 may drive or may additionally drive the PTO 11. And when C2 is in the open state, C2 disengages the second electric motor EM2 from the PTO 11. Usually, C1 or C2 or both may additionally be in a slipped state. Usually, C1 and C2 may be actuated independently, so that at a given time each of C1 and C2 may be in either one of the closed state and the open state. That is, C1 and C2 may usually be in either one of at least four configurations. In the first configuration, both C1 and C2 are closed. In the second configuration, C1 is closed and C2 is open. In the third configuration, C1 is open and C2 is closed. And in the fourth configuration, both C1 and C2 are open.

In the embodiment of the driveline 5 depicted in FIG. 2 C1 and C2 are configured to be controlled by the ECU 10, for example through electromagnetic signals. For instance, the ECU 10 may be configured to control C1 and C2 based on an input signal received from the input device 9. The input signal which the ECU 10 may receive from the input device 9 may be indicative of at least one driveline parameter. The at least one driveline parameter may include at least one of: a requested transmission input speed, a requested transmission input torque, a requested transmission input power, a requested transmission output speed, a requested transmission output torque, a requested transmission output power, a requested PTO speed, a requested PTO torque, and a requested PTO power. Additionally or alternatively, the ECU 10 may be configured to control C1 and C2 based on one or more sensor signals which may be indicative of at least one further driveline parameter. The at least one further driveline parameter may include at least one of: a current transmission input speed, a current transmission input torque, a current transmission input power, a current transmission output speed, a current transmission output torque, a current transmission output power, a current PTO speed, a current PTO torque, and a current PTO power.

However, it is understood that the clutching devices C1, C2 may additionally or alternatively be configured to be controlled manually.

The transmission TM may include any type of stepped ratio or continuously variable transmission. Optionally, the transmission TM is configured to provide at least two different drive ratios or gear ratios between the input 6a and the output 6b of the transmission TM.

Figure 3:
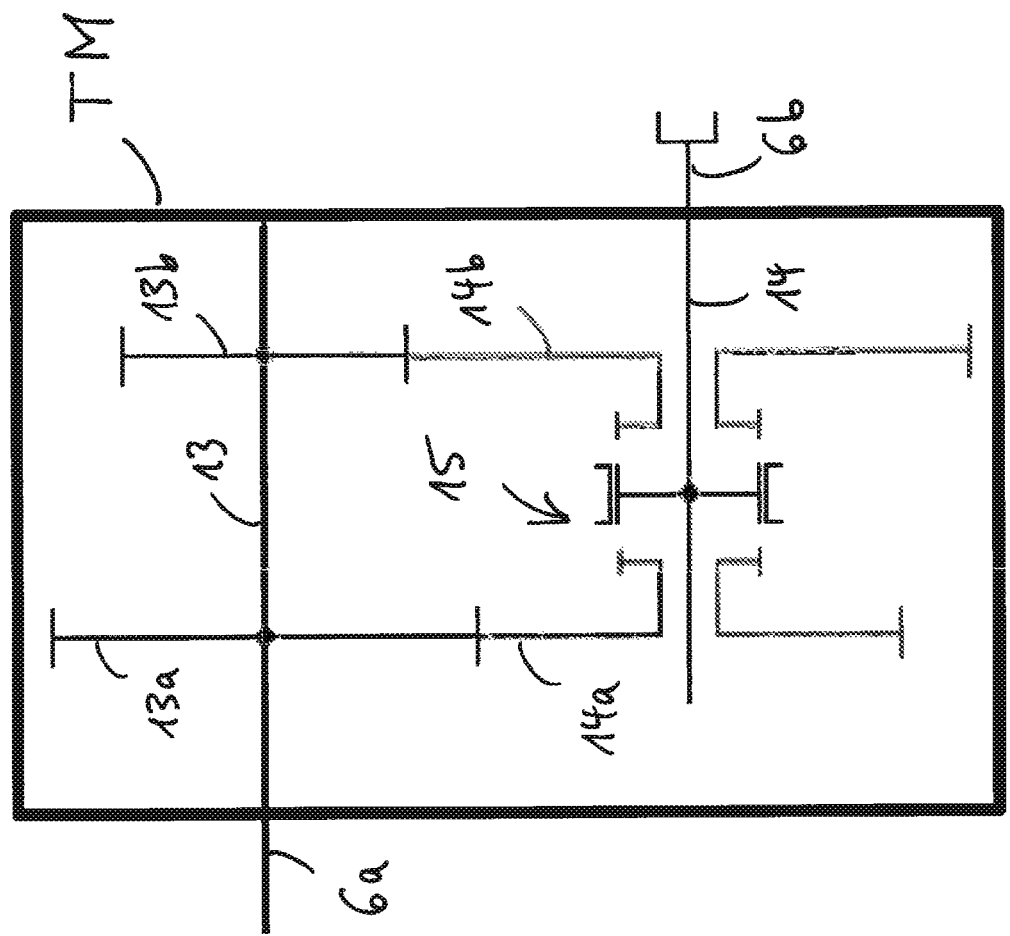
FIG. 3 schematically shows a transmission of the dual motor electric driveline of FIGS. 1 and 2.

One possible layout of the transmission TM is depicted in FIG. 3. The exemplary transmission TM depicted in FIG. 3 comprises an input shaft 13 drivingly engaged with the input 6a and an output shaft 14 drivingly engaged with the output 6b. The transmission TM comprises gears 13a and 13b fixedly disposed on the input shaft 13. A radius and diameter of the gear 13a are larger than a radius and diameter of the gear 13b. And the transmission TM comprises a high range gear 14a and a low range gear 14b that are rotatably disposed on the output shaft 14. The high range gear 14a is drivingly engaged or in mesh with the gear 13a, and the low range gear 14b is drivingly engaged or in mesh with the gear 13b. A radius and diameter of the high range gear 14a are smaller than a radius and diameter of the low range gear 14b. The transmission TM further comprises a synchronizer 15 for selectively rotationally locking one of the gears 14a, 14b with the output shaft 14. The transmission TM further has a neutral gear in which the synchronizer 15 locks neither of the gears 14a, 14b to the output shaft 14. When the transmission TM is in the neutral gear the input 6a and the output 6b of the transmission TM are drivingly disengaged from one another. That is, the synchronizer 15 is configured to select either one of a first gear ratio between the input 6a and the output 6b of the transmission TM, wherein the first gear ratio is provided by the gears 13a, 14a, a second gear ratio between the input 6a and the output 6b of the transmission TM, wherein the second gear ratio is provided by the gears 13b, 14b, and the neutral gear. The synchronizer 15 may be configured to be actuated through electromagnetic forces or through hydraulic forces, for example. The ECU 10 is configured to control the synchronizer 15 and thus to control a shift of the transmission TM between the first gear ratio, the second gear ratio, and the neutral gear.

It is understood that in alternative embodiments the transmission TM may provide more than two drive ratios or gear ratios between the input 6a and the output 6b, and that the transmission TM may include a plurality of other clutching devices for selecting different drive ratios between the input 6a and the output 6b, such as hydraulic clutches, dog clutches, or the like. It is likewise conceivable that the transmission TM comprises a hydrostatic transmission including a first hydraulic pump/motor in driving engagement with the input 6a and a second hydraulic pump/motor in driving engagement with the output 6b, wherein the first hydraulic pump/motor and the second hydraulic pump/motor are in fluid communication with one another so that the first hydraulic pump/motor may drive the second hydraulic pump/motor by circulating a hydraulic fluid such as oil in a closed hydraulic circuit including the first hydraulic pump/motor and the second hydraulic pump/motor, or vice versa, as is generally known in the art of hydrostatic transmissions.

Figure 4C:
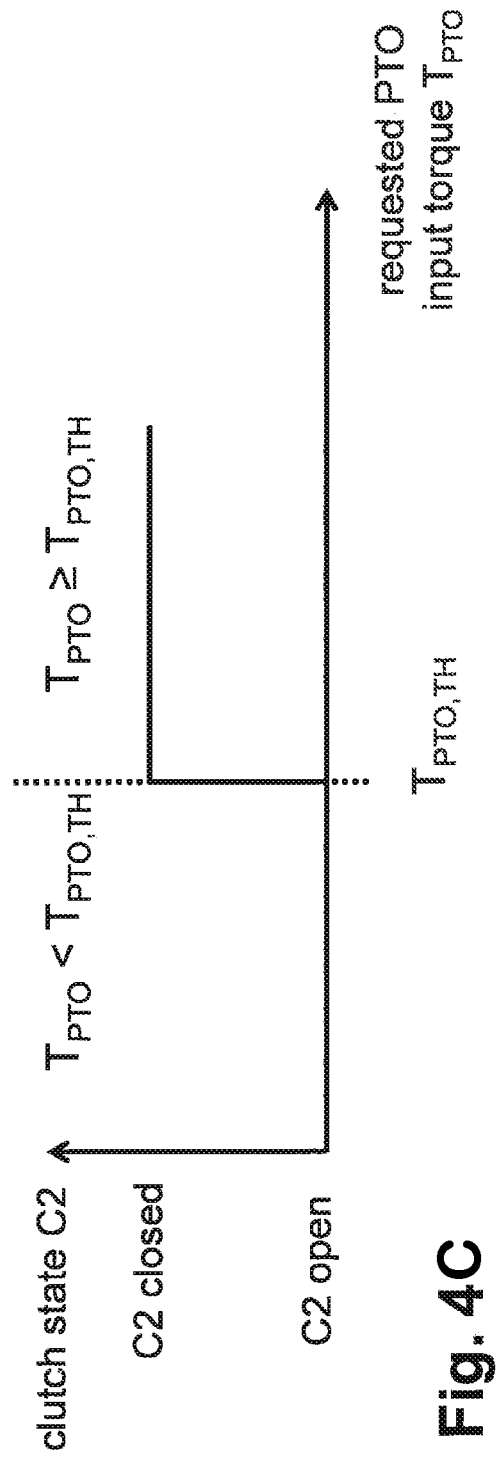
FIG. 4C schematically shows a further embodiment of the method of controlling the second clutching device of the dual motor electric driveline of FIGS. 1 and 2.

FIGS. 4A-C schematically show strategies of controlling the first clutching device C1 which provides selective driving engagement between the second electric motor EM2 and the input 6a of the transmission TM, and of controlling the second clutching device C2 which provides selective driving engagement between the second electric motor EM2 and the PTO 11. In FIGS. 4A-C, the ECU 10 controls C1 and C2 based on a requested torque at the input 6a of the transmission TM (FIGS. 4A-B) or based on a requested torque at the PTO 11 (FIG. 4C). It is understood that additionally or alternatively the ECU 10 may be configured to control C1 and C2 based on one or more of the other driveline parameters or based on one or more of the further driveline parameters mentioned above.

FIG. 4A illustrates that the ECU 10 may close C1 or may be configured to close C1 or to keep C1 closed in order to drivingly connect the second electric motor EM2 with the input 6a of the transmission TM when or once the requested transmission input torque $T_{TM}$ is above or exceeds a transmission input torque threshold $T_{TM,TH}$. For example, $T_{TM,TH}$ may be a predetermined percentage of the maximum torque which the first electric motor EM1 may be capable of providing, for instance $T_{TM,TH}$ may be equal to or larger than 90 percent of the maximum torque of EM1. In this way, it is guaranteed that the requested torque may be provided at the input 6a of the transmission TM.

And FIG. 4A further illustrates that the ECU 10 may open C1 or may be configured to open C1 or to keep C1 open in order to disconnect the second electric motor EM2 from the input 6a of the transmission TM when or once the requested transmission input torque $T_{TM}$ is or falls below the transmission input torque threshold $T_{TM,TH}$. For example, when the first electric motor EM1 alone provides enough torque to fulfill the torque request at the input 6a of the transmission TM, the second electric motor EM2 may be decoupled from the transmission TM.

FIG. 4B illustrates that the ECU 10 may open C2 or may be configured to open C2 or to keep C2 open in order to drivingly disconnect the second electric motor EM2 from the PTO 11 when or once the requested transmission input torque $T_{TM}$ is above or exceeds the transmission input torque threshold $T_{TM,TH}$, so that all torque available from EM2 may be transmitted to the input 6a of the transmission TM.

And FIG. 4B further illustrates that the ECU 10 may close C2 or may be configured to close C2 or to keep C2 closed in order to drivingly connect the second electric motor EM2 with the PTO 11 when or once the requested transmission input torque $T_{TM}$ is or falls below the transmission input torque threshold $T_{TM,TH}$. For example, when the first electric motor EM1 alone provides enough torque to fulfill the torque request at the input 6a of the transmission TM, the second electric motor EM2 may be drivingly connected with the PTO 11 so that both the input 6a of the transmission TM and the PTO 11 may be driven with separate electric motors and with maximum efficiency.

Although in FIGS. 4A and 4B the same transmission input torque threshold $T_{TM,TH}$ is used for controlling C1 and C2, it is conceivable that different threshold values may be used for controlling C1 and C2. For example, in order to engage C1 in a smooth manner, the ECU 10 may be configured or programmed to synchronize a speed of the second electric motor EM2 with a current transmission input speed before or right before closing C1 to drivingly engage the second electric motor EM2 with the input 6a of the transmission TM through C1. In this case, it may be advantageous to open C2 already during the process of synchronizing the speed of EM2 with the current transmission input speed, i. e. possibly before $T_{TM}$ reaches the value of $T_{TM,TH}$ depicted in FIG. 4B.

FIG. 4C illustrates that the ECU 10 may close C2 or may be configured to close C2 or to keep C2 closed in order to drivingly connect the second electric motor EM2 with the PTO 11 when or once a requested PTO torque Tyro is above or exceeds a PTO torque threshold $T_{PTO,TH}$. In order to engage C2 in a smooth manner, the ECU 10 may be configured or programmed to synchronize a speed of the second electric motor EM2 with a current PTO speed before or right before closing C2 to drivingly engage the second electric motor EM2 with the PTO 11 through C2. In this case, it may be advantageous to open C1 already during the process of synchronizing the speed of EM2 with the current PTO speed.

And FIG. 4C further illustrates that the ECU 10 may open C2 or may be configured to open C2 or to keep C2 open in order to drivingly disconnect the second electric motor EM2 from the PTO 11 when or once the requested PTO torque $T_{PTO}$ is or falls below the PTO torque threshold $T_{PTO,TH}$.

It is understood that in alternative embodiments in which the ECU 10 controls C1 and C2 based on other driveline parameters such as a current transmission input speed, a requested transmission input speed, a current transmission input torque, a current transmission input power, a requested transmission input power, a current PTO speed, a current PTO torque, a current PTO power, or a requested PTO power, the above mentioned threshold values $T_{TM,TH}$ and $T_{PTO,TH}$ are optionally replaced by other threshold values such as a transmission input speed threshold, a transmission input power threshold, a PTO speed threshold, or a PTO power threshold.

The ECU 10 may further be configured to simultaneously close both C1 and C2 at the same time and/or to keep C1 and C2 closed at the same time, for example in order to allow energy to be transferred between the PTO 11 and the input 6a of the transmission TM. In this way, energy absorbed via the transmission such as during braking of the wheels 4a, 4b of the electric vehicle 1 may be transmitted to the PTO 11, for example in order to lift a boom or the like. Or energy absorbed via the PTO 11 such as during lowering of a load may be transmitted to the output 6b of the transmission TM in order to provide additional power at the output 6b of the transmission TM. Also, the transmission TM may provide a neutral gear in which the input 6a and the output 6b of the transmission are drivingly disengaged from one another. The ECU 10 may then be configured to shift the transmission TM to the neutral gear and to simultaneously close both C1 and C2 at the same time and/or to keep C1 and C2 closed at the same time. This configuration then allows both electric motors EM1 and EM2 to drive the PTO 11 in case a large amount of torque and/or power is required at the PTO 11.

Figure 5:
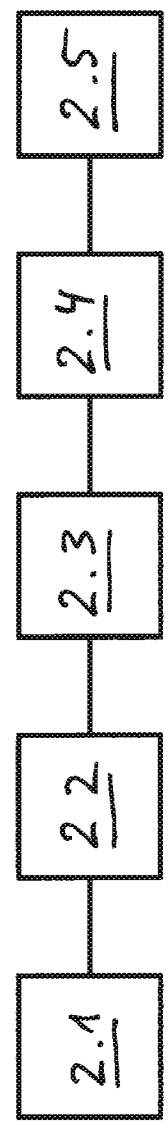
FIG. 5 schematically shows an embodiment of a method of shifting the transmission of FIG. 3.

FIG. 5 schematically shows a strategy of shifting the transmission TM between the first gear ratio provided by the gears 13a, 14a and the second gear ratio provided by the gears 13b, 14b, respectively. It should be emphasized that the strategy illustrated in FIG. 5 and explained here below may relate to both an upshift and a downshift, that is to a shift from the first gear ratio to the second gear ratio and vice versa.

When both EM1 and EM2 are drivingly engaged with the input 6a of the transmission TM and when the requested transmission input torque $T_{TM}$ is below a transmission input torque threshold, for example when $T_{TM} < T_{TM,TH}$, the ECU 10 may carry out or may be configured to carry out one or more or all of the following steps depicted in FIG. 5:

Step 2.1: Opening C1 to drivingly disengage EM2 from the input 6a of the transmission TM.

Step 2.2: Synchronizing a speed of EM1 with a current transmission output speed, taking into account second gear ratio between the input 6a and the output 6b of the transmission after the completion of the shift to the second gear ratio. Synchronizing the speed of EM1 with the transmission output speed is carried out while the input 6a and the output 6b of the transmission TM are drivingly disengaged from one another during the shift, for example while none of the gears 14a, 14b is rotationally locked to the output shaft 14.

Step 2.3: When or once the speed of EM1 has been synchronized with the current transmission output speed, completing the shift from the first gear ratio to the second gear ratio, for example by rotationally locking one of the gears 14a, 14b to the output shaft 14 by means of the synchronizer 15 (see FIG. 3).

Step 2.4: Synchronizing a speed of EM2 with the current transmission output speed, taking into account second gear ratio between the input 6a and the output 6b of the transmission after the completion of the shift to the second gear ratio. Synchronizing the speed of EM2 with the transmission output speed is carried out while C2 is open and EM2 is disengaged from the PTO 11.

And Step 2.5: When or once the speed of EM2 has been synchronized with the current transmission output speed, closing C1 to drivingly engage EM2 with the input 6a of the transmission TM.

The step 2.2 of synchronizing EM1 with the transmission output speed and the step of 2.4 of synchronizing EM2 with the transmission output speed may be carried out either simultaneously or sequentially. When the steps 2.2 and 2.4 are carried out simultaneously, the steps 2.3 and 2.5 of completing the shift and of closing C1 may likewise be carried out simultaneously. By contrast, when the steps 2.2 and 2.4 are carried out sequentially, the step 2.4 is carried out only when or only once the step 2.3 of completing the shift from the first gear ratio to the second gear ratio of the transmission TM has been completed.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    when a requested power or a requested torque is greater than a respective threshold, operating a driveline in a first mode, the first mode comprising engaging a first electric motor and a second electric motor to an input of a transmission; and
    when the requested power or the requested torque is less than the respective threshold, operating the driveline in a second mode, the second mode comprising engaging the first electric motor to the input of the transmission and engaging the second electric motor to an input of a power take-off (PTO);
    wherein the first electric motor and the second electric motor are connected to a coupling device, and the coupling device is connected to the input of the PTO and the input of the transmission, and
    wherein the coupling device comprises:
        a first reduction ratio between the first electric motor and the transmission, and a second reduction ratio between the second electric motor and the transmission; and
        the transmission comprises a first gear ratio and a second gear ratio.

2. The method of claim 1, wherein in the first mode a first clutch is in a first position and a second clutch is in a second position and in the second mode the first clutch is in a second position and the second clutch is in a first position.

3. The method of claim 2, wherein when a requested PTO input is greater than a respective threshold, changing the position of the second clutch.

4. The method of claim 1, further comprising synchronizing a speed of the second electric motor to a transmission speed before connecting the second electric motor to the input of the transmission.

5. The method of claim 1, further comprising shifting between the first gear ratio and the second gear ratio.

6. The method of claim 5, further comprising synchronizing a speed of the second electric motor to a transmission speed before connecting the second electric motor to the input of the transmission, wherein the synchronizing the speed of the second electric motor takes into account a current gear ratio.

7. The method of claim 1, further comprising operating in the first gear ratio and the second gear ratio, wherein operating in the first gear ratio comprises engaging a first set of gears, and operating in the second gear ratio comprises engaging a second set of gears, and
    rotationally locking one of the first set of gears or the second set of gears to an output shaft with a synchronizer.

8. A method comprising:
    operating a driveline in a first mode when a requested power or a requested torque is greater than a respective threshold, the first mode comprising engaging a first electric motor and a second electric motor to an input of a transmission via one or more clutches; and
    operating the driveline in a second mode when the requested power or the requested torque is less than the respective threshold, the second mode comprising engaging the first electric motor to the input of the transmission and engaging the second electric motor to an input of a power take-off (PTO) via the one or more clutches,
    wherein the first electric motor and the second electric motor are connected to a coupling device, and the coupling device is connected to the input of the PTO and the input of the transmission, and
    wherein the coupling device comprises:
        a first reduction ratio between the first electric motor and the transmission, and a second reduction ratio between the second electric motor and the transmission; and
        the transmission comprises a first gear ratio and a second gear ratio.

9. The method of claim 8, wherein the one or more clutches comprises a first clutch and a second clutch, and
    wherein a state of the first clutch and a state of the second clutch are changed to engage the second electric motor to the input of the PTO or to engage the input of the transmission.

10. The method of claim 8, wherein the one or more clutches comprises a first clutch and a second clutch, and
    the first clutch switches between a first state and a second state and the second clutch switches between a first state and a second state when the second electric motor is switched between being engaged with the input of the PTO and being engaged with the input of the transmission.

11. The method of claim 8, wherein the coupling device comprises the one or more clutches and the one or more clutches engage an output of the second electric motor to the input of the transmission or engage the output of the second electric motor to the input of the PTO.

12. The method of claim 8, further comprising switching between the first gear ratio and the second gear ratio.

13. A system comprising:
    a first electric motor and a second electric motor connected to a coupling device;
    the coupling device connected to a power take-off (PTO) and a transmission, the coupling device comprising one or more clutches; and
    an electronic control unit (ECU) with instructions stored in memory to:
        change a state of the one or more clutches to engage the first electric motor and the second electric motor to an input of the transmission when a requested motor input is greater than a respective threshold, and
        change the state of the one or more clutches to engage the first electric motor to the input of the transmission and engage the second electric motor to an input of the PTO when the requested motor input is less than the respective threshold,
    wherein the first electric motor and the second electric motor are connected to a coupling device, and the coupling device is connected to the input of the PTO and the input of the transmission, and
    wherein the coupling device comprises:
        a first reduction ratio between the first electric motor and the transmission, and a second reduction ratio between the second electric motor and the transmission; and
        the transmission comprises a first gear ratio and a second gear ratio.

14. The system of claim 13, wherein the ECU comprises further instructions for:
    switching between the first gear ratio of the transmission and the second gear ratio of the transmission.

15. The system of claim 14, wherein the transmission comprises a synchronizer; and
    wherein the ECU comprises further instructions for:
        synchronizing a speed of the first electric motor with a transmission speed before switching between the first gear ratio and the second gear ratio.

16. The system of claim 13, wherein the ECU comprises further instructions for:
    synchronizing a speed of the second electric motor with a transmission speed before engaging the second electric motor to the input of the transmission.

17. The system of claim 13, wherein the ECU comprises further instructions for:
    change the state of the one or more clutches to engage the transmission to the PTO such that the PTO may provide energy to the transmission or the transmission may provide energy to the PTO.

18. The system of claim 13, wherein the ECU comprises further instructions for:
    change the transmission to a neutral state and change the state of the one or more clutches to engage the first electric motor and the second electric motor to the input of the PTO.

* * * * *